Sept. 9, 1930.　　　G. L. CANTWELL　　　1,775,306
AUTOMOBILE SIGNAL
Filed Jan. 23, 1929　　　2 Sheets-Sheet 1
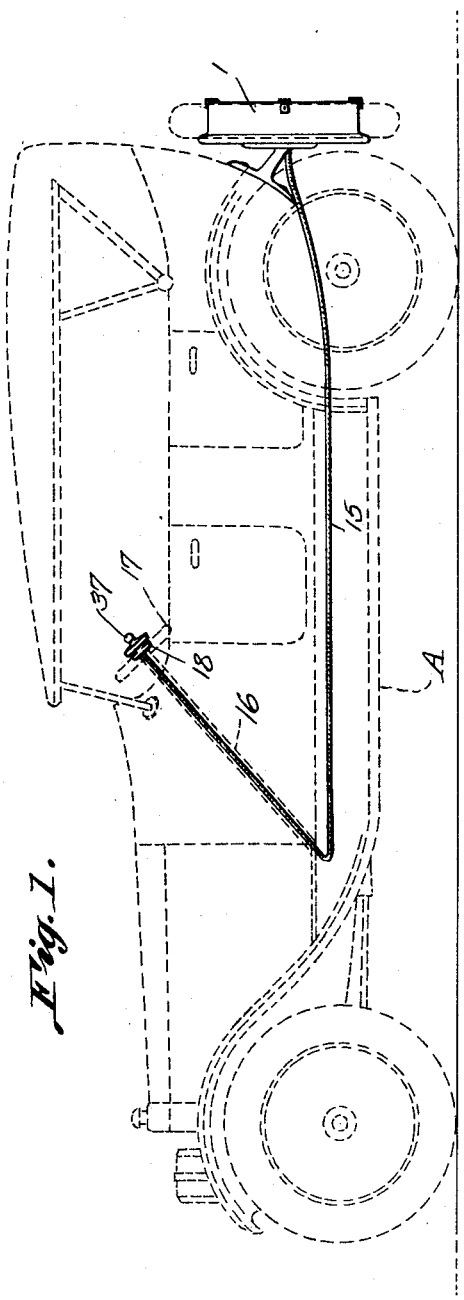
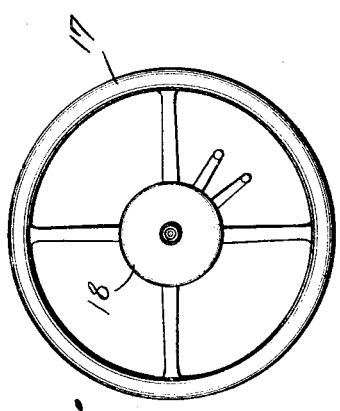

Sept. 9, 1930.  G. L. CANTWELL  1,775,306
AUTOMOBILE SIGNAL
Filed Jan. 23, 1929  2 Sheets-Sheet 2
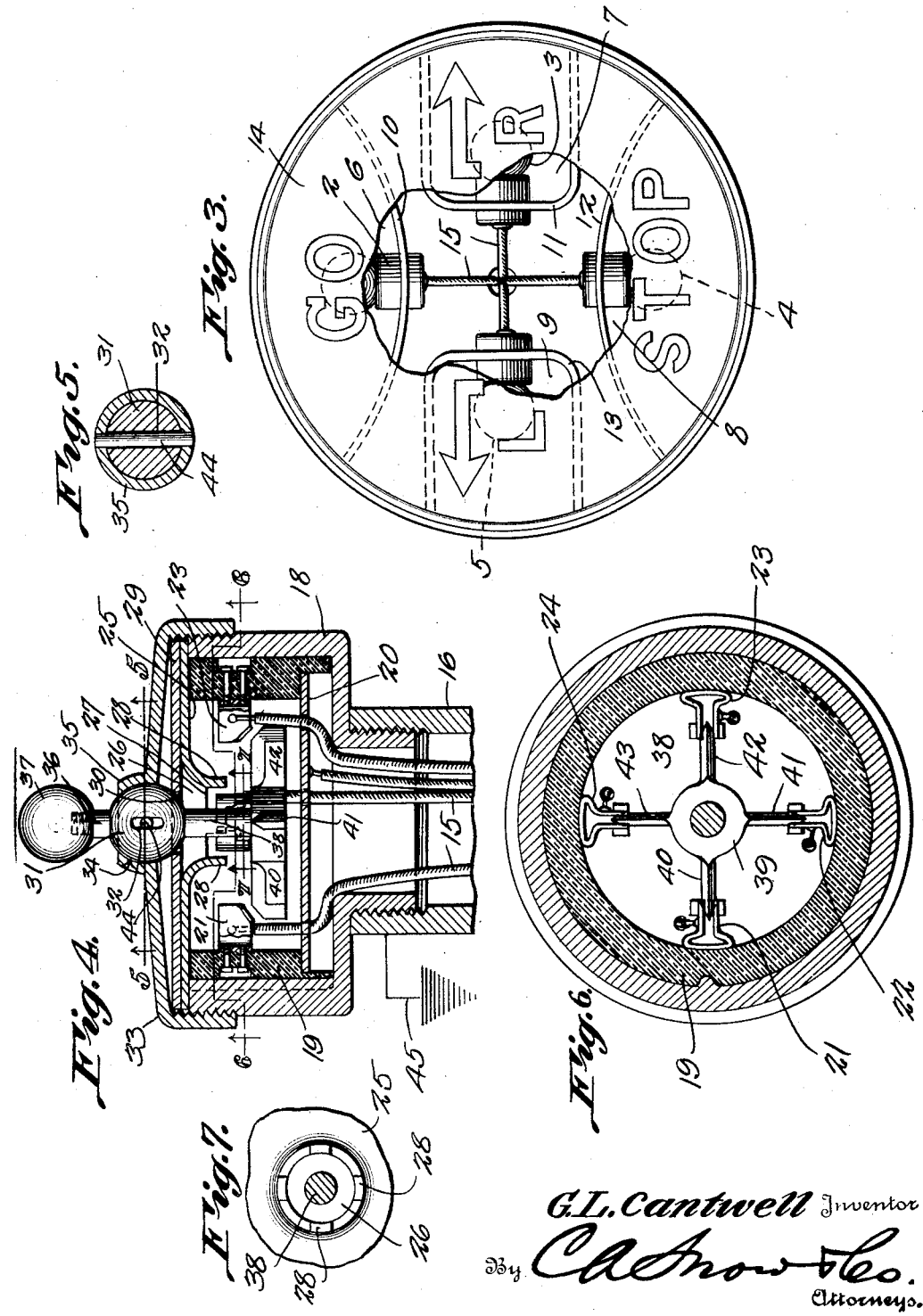

Patented Sept. 9, 1930

1,775,306

UNITED STATES PATENT OFFICE

GEORGE L. CANTWELL, OF WICHITA, KANSAS, ASSIGNOR TO THE CANTWELL ELECTRIC AUTO SIGNAL COMPANY, OF WICHITA, KANSAS

AUTOMOBILE SIGNAL

Application filed January 23, 1929. Serial No. 334,574.

This invention relates to an automobile signal and more particularly to a switch for controlling the same.

One of the objects of this invention is to provide a signal of this character which can be operated readily by means of a switch located at the center of the steering wheel, this switch being shifted readily to any one of several positions whereby any one of several signal units can be illuminated to indicate to persons at the rear the intent of the driver.

With the foregoing and other objects in view which will appear as the description proceeds, the invention resides in the combination and arrangement of parts and in the details of construction hereinafter described, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of the complete apparatus, the automobile to which it is applied being indicated by broken lines.

Figure 2 is an enlarged plan view of the steering wheel showing the location of the switch at the center thereof.

Figure 3 is a rear elevation of the combined spare tire holder and lamp housing forming a part of the apparatus, a portion of the rear surface of the housing being broken away.

Figure 4 is an enlarged central vertical section through the controlling mechanism in the upper end of the post of the steering wheel.

Figure 5 is a section on line 5—5, Figure 4.

Figure 6 is a section on line 6—6, Figure 4.

Figure 7 is a section on line 7—7, Figure 4.

Referring to the figures by characters of reference, A designates an automobile structure provided, at the rear end thereof, with a spare tire holder 1 which can constitute a housing for lamps 2, 3, 4, and 5 located in separate compartments 6, 7, 8, and 9 formed by partitions 10, 11, 12, and 13 respectively. The rear wall of this housing, indicated at 14, can be formed of a transparent or a translucent material or can be made of an opaque material with transparent or translucent portions thereon. In any event there is provided at each of the compartments 6, 7, 8, and 9 an indicating word or sign adapted to be clearly disclosed when the lamp in said housing is lighted. For example in front of the upper compartment 6 there may be displayed the word "Go" while at the lower compartment 8 may be displayed the word "Stop". The letter "R" and an arrow pointing to the right may be arranged at the compartment 7 while the letter "L" and an arrow pointing to the left may be arranged at the compartment 9.

Wires leading to the several lamps have been indicated generally at 15 and are extended forwardly within the vehicle structure and thence upwardly within the post 16 of the steering wheel 17.

Mounted on the upper portion of the post 16 is a cylindrical housing 18 preferably extending over the hub of the steering wheel and this housing has a ring 19 of insulating material fitted therein. Firmly seated in the lower portion of this ring is a spacing disk 20 through which the several wires 15 are extended. Secured to the inner surface of the insulating ring 19 at regular distances apart are forked contacts 21, 22, 23, and 24 electrically connected to the respective wires 15. These contacts are extended toward the center of the insulating ring 19.

Mounted on the housing 18 and ring 19 is a disk 25 having a central depression 26 open at the bottom as shown at 27 and extending downwardly from the wall of the opening inwardly from the respective forked contacts are stop ears 28. A supporting disk 29 is mounted on the disk 25 and has a central opening 30. In this opening is seated the lower portion of a ball 31 having a diametrical slot 32. A cap 33 is removably mounted on the housing 18 to constitute means for clamping the disks 29 and 25 in position on the housing. This cap has a central opening 34 surrounded by a curved flange 35 which laps the upper portion of the ball 31 and serves to hold it seated in the opening 30.

A stem 36 is extended upwardly from the ball 31 and has a knob 37 thereon. Another stem 38 is extended downwardly from the ball and is provided, at its lower end, with a hub 39 from which radiate blades 40, 41, 42, and 43 respectively. These blades have upper knife edges normally spaced below the respective forked contacts, as shown in Figure 4.

A pin 44 is mounted at its ends in the cap 33 and extends diametrically across the opening 34, this pin being extended loosely through the slot 32 and serving to hold the ball 31 against rotation.

The housing 18 and its cap 33 are grounded to the frame of the vehicle as indicated at 45 and the several lamps are also grounded. It will be obvious, therefore, that under normal conditions the circuits to the respective lamps are open.

Should it be desired to indicate to persons back of the vehicle that it is the driver's intention to move forward, the driver presses the knob 37 forwardly. This will cause the ball 31 to rotate in one direction so that the stem 38 will swing and bring the blade 41 into engagement with the forked contact 22. This will close a circuit to the lamp in the compartment 6 and the signal "Go" will be illuminated.

By pulling the knob 37 backwardly the blade 43 will be swung into engagement with the forked contact 24, thereby closing the circuit to the lamp 4 and illuminating the signal "Stop".

By pressing the knob 37 to the right the blade 40 will engage the contact 21 and close the circuit to the lamp 3 while, when it is desired to turn to the left, the knob 37 is swung to the left and blade 42 is caused to engage contact 33 and close the circuit to the lamp 5.

By mounting the ball 31 as shown it is only possible for the stem 38 to swing in four directions, namely, forwardly, rearwardly, and to the right or to the left. Swinging movement of the blades is limited by the upwardly moving blade coming into contact with the ear 28 in the path thereof.

When the signal is not in use the knob 37 will be held in its intermediate position by frictional engagement of ball 31 by the flange 35.

What is claimed is:

1. A switch including spaced contacts, a diametrically slotted ball, means for holding the ball for rotation, means extending through the slot and engaging the holding means to insure rotation of the ball about predetermined axes, a stem connecting the ball to the radial blades, and means mounted on the ball for shifting said ball and stem thereby to move any one of the blades into engagement with one of the contacts.

2. In a device of the class described a housing, an insulating ring within the housing, spaced contacts carried thereby, a disk mounted on the housing of the insulating ring having a central opening, stop projections adjacent the opening, a bearing disk, a ball mounted on the bearing disk, a cap engaging the ball for holding it to the disk and for holding both disks to the housing, stems extending in opposite directions to the ball, blades radiating from one of the stems and normally positioned below and away from the respective contacts and below and away from the respective stop projections, means upon the other stem for shifting the ball to bring any one of the blades into engagement with the adjacent contact, and means engaging the ball and the cap for restricting the ball in its rotation to guide the blades to their respective contacts.

In testimony that I claim the foregoing as my own, I have hereto affixed my signature.

GEORGE L. CANTWELL.